United States Patent
Wolf et al.

[11] Patent Number: 6,123,395
[45] Date of Patent: Sep. 26, 2000

[54] PROCESS AND DEVICE FOR DETERMINING A PRESSURE VALUE

[75] Inventors: Michael Wolf, Kornwestheim; Jürgen Binder, Stuttgart; Helmut Wiss, Möglingen, all of Germany

[73] Assignee: Robert Bosch GmbH, Stuttgart, Germany

[21] Appl. No.: 09/011,487
[22] PCT Filed: Jul. 11, 1996
[86] PCT No.: PCT/DE96/01246
§ 371 Date: Feb. 2, 1998
§ 102(e) Date: Feb. 2, 1998
[87] PCT Pub. No.: WO97/06038
PCT Pub. Date: Feb. 20, 1997

[30] Foreign Application Priority Data
Aug. 4, 1995 [DE] Germany .............. 195 28 697

[51] Int. Cl.⁷ .................................................. B60T 13/18
[52] U.S. Cl. ........................ 303/11; 303/116.1; 303/155
[58] Field of Search ........................... 303/113.4, 155, 303/166, DIG. 4, 11, 116.1

[56] References Cited

U.S. PATENT DOCUMENTS

| | | | |
|---|---|---|---|
| 5,273,348 | 12/1993 | Yagi et al. | 303/119.2 |
| 5,487,593 | 1/1996 | Potts et al. | 303/11 |
| 5,623,531 | 5/1997 | Batistic et al. | 303/113.4 |

FOREIGN PATENT DOCUMENTS

94/18401  2/1993  WIPO .................. 303/113.4

OTHER PUBLICATIONS

Eshbach's Handbook of Engineering Fundamentals Fourth Edition, Byron Tapley (editor), pp. 8–98–8–99, Published by John Wiley & Sons, Inc., Dec. 1990.

*Primary Examiner*—Robert J. Oberleitner
*Assistant Examiner*—Robert A. Siconolfi
*Attorney, Agent, or Firm*—Kenyon & Kenyon

[57] ABSTRACT

A method and a device for determining a pressure variable, in particular in a braking system having a delivery pump. The differential pressure between a first line and a second line is determined using as a baseline a variable which represents a measure for the speed of the delivery pump.

31 Claims, 2 Drawing Sheets

PROCESS AND DEVICE FOR DETERMINING A PRESSURE VALUE

FIELD OF THE INVENTION

The present invention relates to a method and a device for determining a pressure variable, in particular a differential pressure in a braking system equipped with anti-lock and/or traction control.

BACKGROUND INFORMATION

International Patent Application No. 94/18041 describes a method and a circuit arrangement for determining the force exerted on the pedal as a controlled variable for a braking system equipped with anti-lock control. The braking system includes, inter alia, a hydraulic pump. The hydraulic pump is used to recirculate pressurized media that had been drawn from the wheel brake to reduce pressure. On the other hand, the hydraulic pump is used to supply auxiliary pressure. In the method described in International Patent Application No. 94/18041, during a closed-loop control braking, the drive motor of a hydraulic pump is switched over to generator operation, and the level of the generator voltage and its decay behavior are evaluated. From the generator voltage and the decay behavior, one is able to determine by approximation the initial pressure that is a function of the force exerted on the pedal.

German Patent Application No. 38 19 490 A1 describes a pump system of a hydraulic final controlling element for adjusting a movable member of an object. This object is, for example, a brake of an anti-lock control system of a motor vehicle. The pump system has an electromotor for driving a pump, which is used to exert influence on a hydraulic fluid pressure. In addition, the pump system comprises a testing device for determining the pressure of the hydraulic fluid and, thus, for monitoring the performance reliability of the hydraulic. In this context, the pressure is not measured with the aid of a sensor, but rather using as a baseline the detected engine speed, the detected active current consumption of the electromotor, and the active operating voltage at the electromotor. Using as a baseline the determined pressure value of the hydraulic fluid, the electromotor is driven, i.e., the performance reliability of the hydraulic is monitored. In addition, German Patent Application No. 38 19 490 A1 describes a method of determining the torque of the electromotor using the motor voltage and the motor current as a baseline.

SUMMARY OF THE INVENTION

An object of the present invention is to provide an optimal method and an optimal device which defines a pressure, variable, in particular the differential pressure in a braking system equipped with anti-lock and/or traction control, without any sensors for detecting the pressure.

The device and the method of the present invention enables the differential pressure, in particular in a braking system equipped with anti-lock and/or traction control, to be determined in an inexpensive and uncomplicated manner.

As a result, it would be possible to detect differential pressures without using expensive sensors. The driving of the discharge and, in particular, the intake valves is optimized, which automatically leads to an improvement in the control response, in that the differential pressure is taken into consideration in the driving of the discharge or intake valves.

A further advantage is attained when working with so-called cadence braking. Cadence braking is at hand when the driver causes considerable variations in initial pressure PV. Using the above estimation of the differential pressure, the drop in initial pressure can be simply detected, and the ABS control modified accordingly.

DETAILED DESCRIPTION OF THE INVENTION

It is known to use electrically actuated intake and discharge valves to modulate the pressure prevailing in the individual wheel brakes of a vehicle equipped with anti-lock and/or traction control. For this, two-way valves are preferably used. The desired pressure build-up gradient or pressure reduction gradient is achieved by driving the valves with pulse trains and by varying the mark-to-space ratio i.e. ratio of pulse duration to interpulse period.

The intake valve, which is installed in the brake line between the brake-pressure sensor, i.e. the master brake cylinder, and the wheel brake, in its neutral position is generally switched to allow passage, while the discharge valve, which is used to reduce pressure, in its neutral position, blocks the path of the pressurized media back to the master brake cylinder via a return pump.

In place of the intake/discharge valve pairs, valve configurations with three switching positions can also be used.

Figure 1:
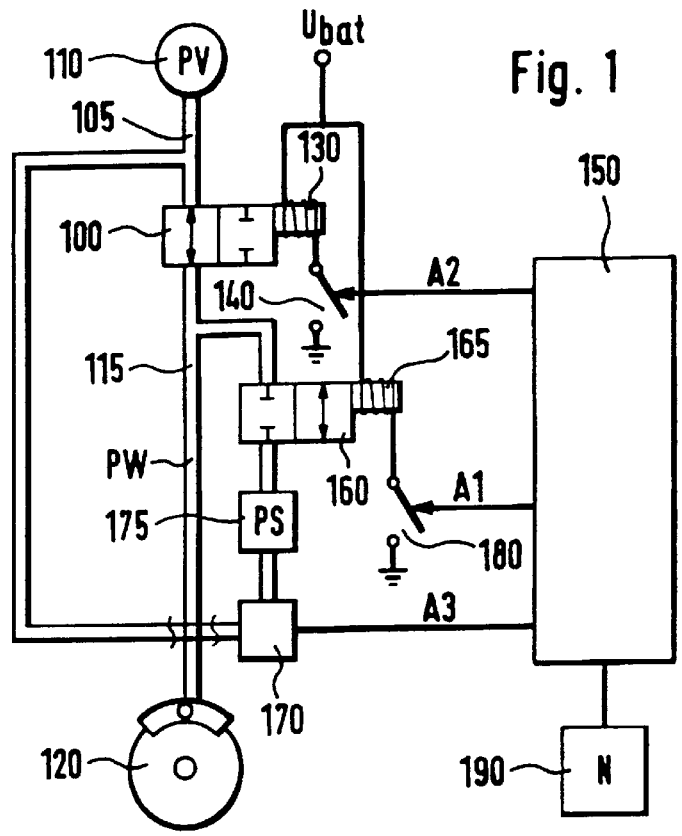
FIG. 1 shows a scheme of the essential elements of a device according to the present invention.

The relationships are illustrated in FIG. 1 based on the example of an intake valve and of a discharge valve of an anti-lock and/or traction control. The described procedure is not limited solely to use with intake and discharge valves in braking systems equipped with anti-lock and/or traction control; it can also be used in other applications having similar arrangements.

An intake valve 100 communicates using a first connection, via a first line 105, with a master brake cylinder 110. A pressure PV, referred to as initial pressure, usually prevails in the first line. The second connection of intake valve 100 communicates via a second line 115 with wheel brake 120. Pressure PW, which defines the braking force of the wheel, prevails in second line 115.

There is a connection from second line 115 to a connection of a discharge valve 160, whose second connection communicates with an accumulator 175. Accumulator 175 communicates via a return pump 170 with the master brake cylinder.

Intake valve 100 shown is a so-called 2/2 solenoid valve. In its neutral position, for as long as no current flows, intake valve 100 enables passage between first line 105 and second line 115. In this position, the solenoid valve armature is retained by a spring. Current is conducted through a coil 130 to exert a force against the spring resilience, forcing the valve into its closed position.

Discharge valve 160 shown is likewise a so-called 2/2 solenoid valve. In its neutral position, for as long as no current flows, solenoid valve 160 blocks the passage between second line 115 and return pump 170. In this position, the solenoid valve armature is retained by a spring.

Current is conducted through a coil 165 to exert a force against the spring resilience, forcing the valve into its open position.

Coil 165 is linked via a first electrical connection to a supply voltage Ubat and via a second connection to a switching element 180. Coil 130 is linked correspondingly via a first electrical connection to supply voltage Ubat and via a second connection to a second switching element 140. Field-effect transistors are preferably used as switching elements.

The gate of first switching element 180 communicates with a control unit 150. Using this connection, first switching element 180 receives a first drive signal A1. The gate of second switching element 130 likewise communicates with control unit 150 and receives from it a second drive signal A2.

Closing switching elements 140 and 180 releases the current flow between the supply voltage through coil 130 or 165 to the grounded connection.

Control unit 150 is preferably an anti-lock and/or traction control. It processes various signals from different sensors or signals from other control units, such as from a vehicle-speed closed-loop control, a dynamic driving-performance closed-loop control, and/or from a vehicle-speed limitation. In particular, this device processes signals from engine speed sensors 190, which detect the rotational speeds of the various wheels of the motor vehicle. Using the various processed signals as a baseline, control unit 150 determines signals A1 and A2 for driving coils 130 and 165.

The build-up and reduction of pressure in second line 115 and, thus, in wheel brake cylinder 120 can be controlled by valves 100 and 160.

Furthermore, control unit 150 applies a drive signal A3 to the return pump.

The functioning of this device shall now be described in the following. In normal operation, the solenoid valves are in their position, as shown. If the driver actuates the brake pedal (not shown), then the pressure is increased in line 105, producing a corresponding rise in pressure in second line 115. If a wheel slips or tends to lock up, then control unit 150 goes into action. Here, the distinction essentially has to be made among three states.

In the pressure-reduction state, control unit 150 drives intake valve 100, causing it to close. At the same time, it drives discharge valve 160, causing it to open. In this manner, the connection between wheel-brake cylinder 120 and accumulator 175 is released. Return pump 170 delivers the hydraulic fluid out of accumulator 175 back into master-brake cylinder 110. By this means, a difference in pressure is built up between initial pressure PV in the master-brake cylinder and pressure PS in the accumulator. This difference in pressure is described as differential pressure.

In the pressure-retaining state, both solenoid valves are forced into their closed state.

In the pressure build-up state, control unit 150 drives the intake valve into its open position and discharge valve 160 into its closed position.

To achieve an optimal driving of the discharge valves and, in particular, of the intake valves, differential pressure PD prevailing between pressure PV in first line 105 and pressure PS in accumulator 175 should be known. The present invention recognizes that differential pressure PD is able to be determined by using as a baseline a variable that represents a measure for the speed of the return pump. This applies particularly for as long as discharge valve 160 enables passage.

Figure 2:
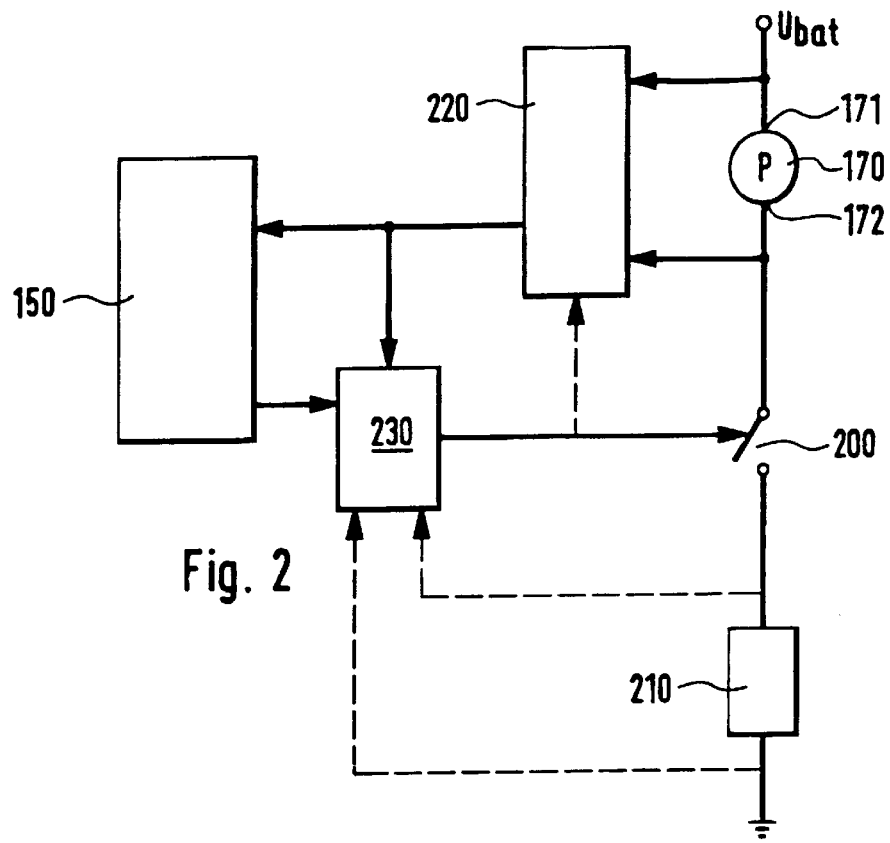
FIG. 2 shows a block diagram for driving a return pump.

FIG. 2 shows a device for driving return pump 170. Elements already described in FIG. 1 are denoted with corresponding reference numerals. Return pump 170 is linked via its first connection 171 with supply voltage Ubat. Its second connection 172 is connected via a switching element 200 as well as a current-measuring means 210 to ground. One line each leads from connection 171 and connection 172 of return pump 170 to a return pump evaluation 220. Return pump evaluation 220 applies a signal to control unit 150 and to return pump control 230.

Return pump control 230 receives a signal from control unit 150 and applies a driving signal both to switching element 200 as well as, if indicated, to return-pump drive 220. Current-measuring means 210 is preferably realized as an ohmic resistor, at whose two connection terminals a voltage value is tapped off and routed to return pump control 230.

This device functions as follows. In a first exemplary embodiment, only return pump 170 is controlled. Thus using the request signal from control unit 150 as a baseline, return pump control 230 drives switch 200 so that return pump 170 conducts current.

The return pump is preferably driven in a clocked mode. Return pump evaluation 220 detects the voltage being applied to the return pump. The voltage being applied to the return pump during the de-energizing pauses is a measure of the return pump's speed. Using this voltage as a baseline, the differential pressure can be determined in accordance with the present invention and fed to control unit 150.

Furthermore, the voltage or the speed of the return pump can be fed to return-pump control 230. Here, the voltage or the speed of return pump 170 can be controlled in closed loop by return-pump control 230 by varying the pulse duty factor or the mark-to-space ratio.

Another exemplary embodiment of the present invention provides for the current flowing through return pump 170 to be detected, using the voltage drop across current-measuring means 210 as a baseline, and to be controlled in closed loop to a predefinable setpoint value.

Figure 3:
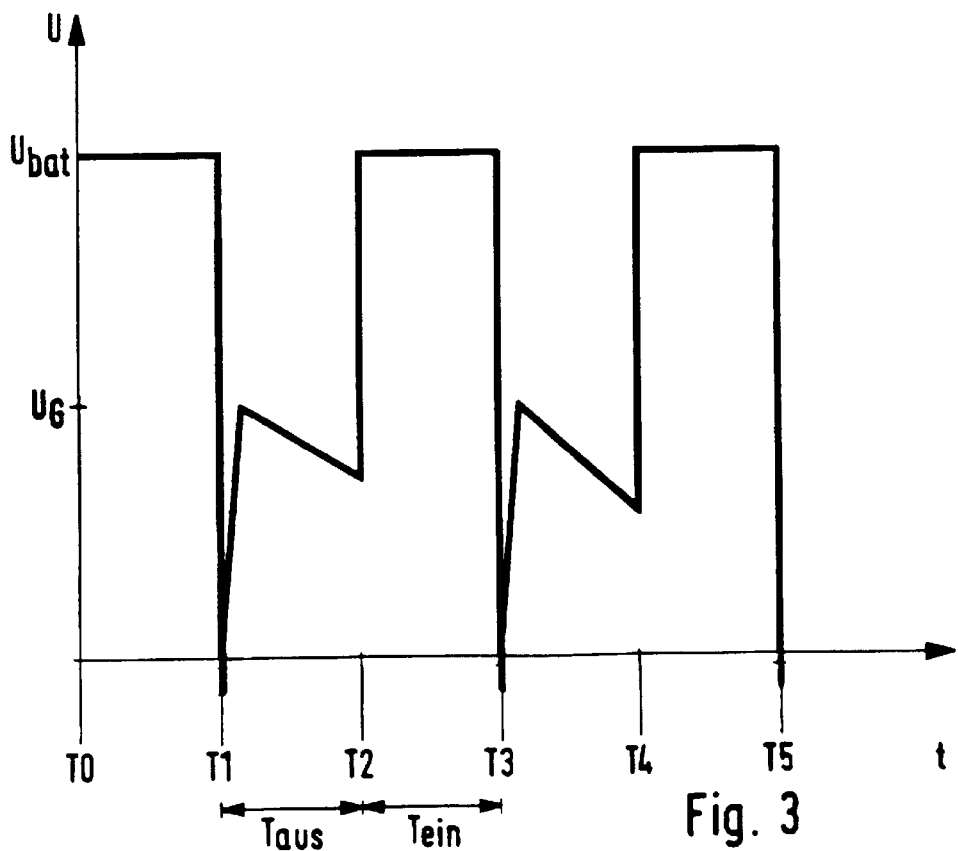
FIG. 3 shows a voltage applied to the return pump plotted over time.

In FIG. 3, voltage U applied to return pump 170 is plotted over time t. At instant T0, circuit element 200 is closed. The voltage dropping across return pump 170 corresponds approximately voltage Ubat. At instant T1, switch 200 is opened and the voltage drops briefly to values less than zero. The interpulse period of the pulse train begins at instant T1.

The pump that continues to run during interpulse period Taus between instants T1 and T2 now functions as a generator. As a result, a voltage is generated at the return pump, said voltage dropping off slowly over time, starting from value UG.

At instant T2, switch 200 is closed again, and the voltage rises to supply voltage Ubat. At instant T3, after expiration of time $T_{ein}$, the voltage drops again to values less then zero, and then rises again to value UG. At instant T4, switch 200 is closed again and held in its closed position until instant T5.

Figure 4A:
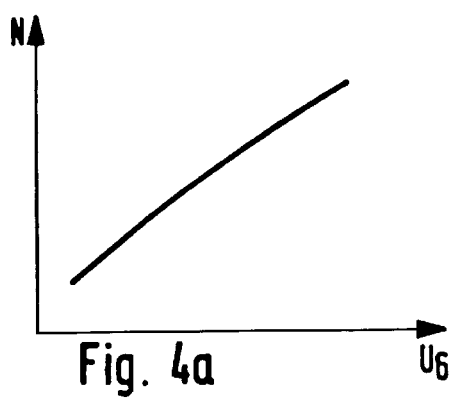
FIGS. 4a–4d shows various signals as a function of each other.

The value of voltage UG, which drops across return pump 170 at the beginning of the interpulse period, is essentially a function of speed N of the return pump. This relationship is shown in FIG. 4*a*. At low return-pump speeds, a low voltage UG is produced, and at high speeds, a high voltage UG.

Figure 4B:
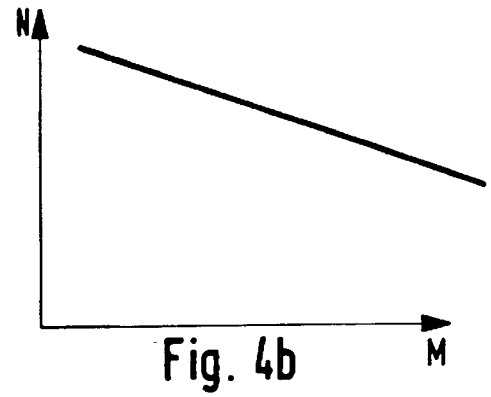

The speed of the return pump, in turn, is a function of torque M to be produced by the pump. This relationship is shown in FIG. 4*b*. A small torque M results in a high speed, and a large torque in a low speed N.

Figure 4C:
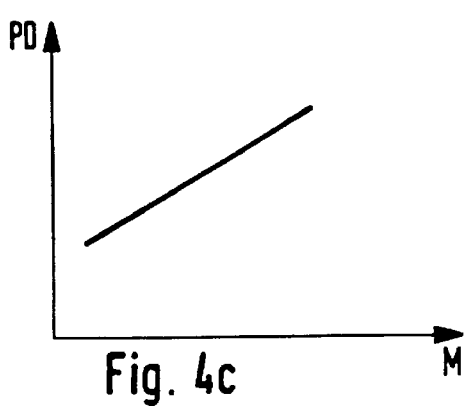

A large torque is necessary when there is a large pressure differential PD between the input and the output of the pump. A small torque is necessary when there is a small pressure differential PD. This relationship is shown in FIG. 4c.

However, the requisite torque M not only has an effect on the speed and, thus, on value UG of the dropping voltage, but also has an effect on the voltage profile. The voltage drops off more quickly in response to a larger torque. This is the case, for example, in the time period between T3 and T4.

Figure 4D:
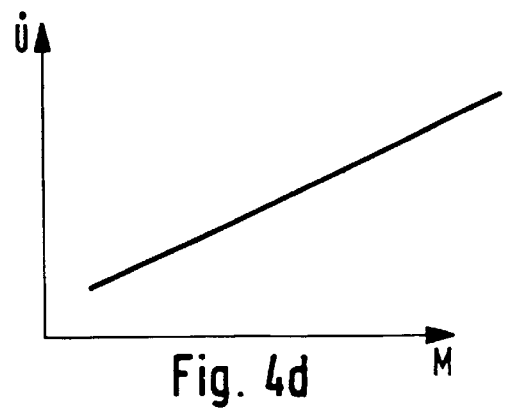

In FIG. 4d, the relationship between the change in voltage U̇, and torque M is plotted. At a large torque M, a large change in voltage U̇ results, and at a small torque M, a small change in voltage U̇ results.

Differential pressure PD is determined during the de-energizing pauses using the voltage applied to the pump as a baseline. Subsequent to the de-energizing, the speed of return pump results in accordance with FIG. 4a using value UG as a baseline. This value can also be fed to return pump control 230 for controlling speed in closed loop. Using speed N as a baseline, torque M to be produced by the pump results in accordance with FIG. 4b. Using torque M as a baseline, differential pressure PD results in accordance with FIG. 4c.

This determination is carried out in return-pump evaluation 220. This can take place on the basis of the characteristics maps depicted in FIG. 4a, 4b and 4c, i.e., in accordance with a predefined algorithm.

Furthermore, it is possible to determine the torque in accordance with FIG. 4d, i.e. in accordance with an algorithm, using as a baseline the voltage drop or the profile of voltage U in the de-energizing pause. Then, using torque M as a baseline, differential pressure PD results, as shown in FIG. 4c.

A further exemplary embodiment of the present invention determines differential pressure PD, using as a baseline the voltage UG applied to the pump in the de-energizing pauses, the setpoint value for voltage UG, and the pulse duty factor required to modulate generator voltage UG to the setpoint value. The prerequisite here is that provision be made for a control in closed loop of voltage U dropping across return pump 170 during the de-energizing pauses, and that supply voltage Ubat be known.

The driving of the intake and discharge valve can be improved using the defined differential pressure PD.

Since, as a rule, pressure PS prevailing in accumulator 175 is small compared to initial pressure PV, pressure difference PD corresponds to initial pressure PV. The described procedure can be used to estimate initial pressure PV.

A further advantage is attained when working with so-called cadence braking. Cadence braking is at hand when the driver causes considerable variations in initial pressure PV. Using the above estimation of the differential pressure, the drop in initial pressure can be simply detected (i.e. recognized), and the ABS control modified accordingly.

What is claimed is:

1. A method for determining a pressure variable in a system, the system including a delivery pump communicating via a first line with a master brake cylinder and an accumulator, the method comprising the steps of:
   driving the delivery pump in a clocked manner;
   detecting a voltage being applied to the delivery pump during de-energizing pauses; and
   determining a differential pressure between a first pressure in the first line and a second pressure in the accumulator by:
   determining a torque generated by the delivery pump, the torque being determined as a function of at least one of a voltage drop and a profile of the voltage at the delivery pump during the de-energizing pauses; and
   determining the differential pressure as a function of the torque.

2. The method according to claim 1, further comprising the step of:
   using characteristics maps to determine at least one of:
   a) a speed of the delivery pump using the voltage being applied to the delivery pump determined during the de-energizing pauses,
   b) the torque using the speed of the delivery pump, and
   c) the differential pressure using the torque.

3. The method according to claim 1, further comprising the step of:
   while the differential pressure is determined, delivering a hydraulic fluid out of a wheel brake cylinder via the accumulator into the master brake cylinder using the delivery pump.

4. The method according to claim 1, further comprising at least one of the following steps:
   a) utilizing the differential pressure determined during at least one of the driving of an intake valve and discharge valves contained in the braking system; and
   b) measuring the initial pressure prevailing in the master brake cylinder by using the differential pressure.

5. The method according to claim 1, further comprising at least one of the following sets of steps:
   a)(I) determining a speed of the delivery pump,
      (ii) providing the speed to a control device, the control device for controlling a closed-loop speed, and
      (iii) controlling the speed in the closed-loop system by varying one of a pulse duty factor and a mark-to-space ratio using the control device;
   b)(I) providing the voltage being applied to the delivery pump the control device, the control device for controlling the closed-loop voltage;
      (ii) controlling the voltage in the closed-loop system by varying one of the pulse duty factor and the mark-to-space ratio using the control device; and
   c)(I) controlling a current flowing through the delivery pump in the closed-loop system to a predetermined setpoint value using the voltage drop across a current-measuring arrangement using the control device.

6. The method according to claim 5, wherein the control device is a return pump control.

7. The method according to claim 1, wherein the system is a braking system.

8. The method according to claim 1, wherein the delivery pump is a return pump.

9. The method according to claim 1, wherein the differential pressure is an initial pressure prevailing in the master brake cylinder.

10. A method for determining a pressure variable in a system, the system including a delivery pump communicating via a first line with a master brake cylinder and an accumulator, the method comprising the steps of:
    driving the delivery pump in a clocked manner;
    detecting a voltage being applied to the delivery pump during de-energizing pauses; and
    determining a differential pressure between a first pressure in the first line and a second pressure in the accumulator by:

determining a speed of the delivery pump as a function of the voltage being applied to the delivery pump during the de-energizing pauses;

determining a torque to be produced by the delivery pump as a function of the speed of the delivery pump; and determining the differential pressure as a function of the torque to be produced by the delivery pump.

11. The method according to claim 10, further comprising at least one of the following sets of steps:

a)(I) providing the speed of the delivery pump to a control device for controlling a closed-loop speed;

(ii) controlling the speed of the delivery pump in the closed-loop system by varying one of a pulse duty factor and a mark-to-space ratio using the control device;

b)(I) providing the voltage being applied to the delivery pump to the control device for controlling the closed-loop voltage;

(ii) controlling the voltage in the closed-loop system by varying one of the pulse duty factor and the mark-to-space ratio using the control device; and c)(I) controlling a current flowing through the delivery pump in the closed-loop system to a predetermined setpoint value using a voltage drop across a current-measuring arrangement using the control device.

12. The method according to claim 11, wherein the control device is a return pump control.

13. The method according to claim 10, further comprising the step of:

using characteristics maps to determine at least one of:
a) a speed of the delivery pump using the voltage being applied to the delivery pump determined during the de-energizing pauses,
b) the torque using the speed of the delivery pump, and
c) the differential pressure using the torque.

14. The method according to claim 10, further comprising the step of:

while the differential pressure is determined, delivering a hydraulic fluid out of a wheel brake cylinder via the accumulator into the master brake cylinder using the delivery pump.

15. The method according to claim 10, further comprising at least one of the following steps:

a) utilizing the differential pressure determined during at least one of the driving of an intake valve and discharge valves contained in the braking system; and b) measuring the initial pressure prevailing in the master brake cylinder by using the differential pressure.

16. The method according to claim 10, wherein the system is a braking system.

17. The method according to claim 10, wherein the delivery pump is a return pump.

18. The method according to claim 10, wherein the differential pressure is an initial pressure prevailing in the master brake cylinder.

19. A method for determining a pressure variable in a system, the system including a delivery pump communicating via a first line with a master brake cylinder and an accumulator, the method comprising the steps of:

driving the delivery pump in a clocked manner;

detecting the voltage being applied to the delivery pump during de-energizing pauses; and determining a differential pressure between a first pressure in the first line and a second pressure in the accumulator as a function of the voltage being applied to the delivery pump during the de-energizing pauses, a setpoint value for the voltage, and a pulse-duty factor required to modulate the voltage to the setpoint value.

20. The method according to claim 19, further comprising the step of:

controlling a voltage drop across the delivery pump in a closed-loop system during the de-energizing pauses, wherein a supply voltage is predetermined.

21. The method according to claim 19, further comprising the step of:

while the differential pressure is determined, delivering a hydraulic fluid out of a wheel brake cylinder via the accumulator into the master brake cylinder using the delivery pump.

22. The method according to claim 19, further comprising at least one of the following steps:

a) utilizing the differential pressure determined during at least one of the driving of an intake valve and discharge valves contained in the braking system; and b) measuring the initial pressure prevailing in the master brake cylinder by using the differential pressure.

23. The method according to claim 19, further comprising at least one of the following sets of steps:

a)(I) determining a speed of the delivery pump,
(ii) providing the speed to a control device, the control device for controlling a closed-loop speed, and
(iii) controlling the speed in the closed-loop system by varying one of a pulse duty factor and a mark-to-space ratio using the control device;

b)(I) providing the voltage being applied to the delivery pump the control device, the control device for controlling the closed-loop voltage;
(ii) controlling the voltage in the closed-loop system by varying one of the pulse duty factor and the mark-to-space ratio using the control device; and c)(I) controlling a current flowing through the delivery pump in the closed-loop system to a predetermined setpoint value using the voltage drop across a current-measuring arrangement using the control device.

24. The method according to claim 23, wherein the control device is a return pump control.

25. The method according to claim 24, wherein the system is a braking system.

26. The method according to claim 24, wherein the delivery pump is a return pump.

27. The method according to claim 24, wherein the differential pressure is an initial pressure prevailing in the master brake cylinder.

28. A device for determining a pressure variable in a system, the device comprising:

a delivery pump communicating via a first line with a master brake cylinder and an accumulator;

a first arrangement for driving the delivery pump in a clocked manner; and a second arrangement for detecting during de-energizing pauses a voltage being applied to the delivery pump;

wherein the second arrangement is utilized for determining a differential pressure between a first pressure in the first line and a second pressure in the accumulator by:

determining a speed of the delivery pump as a function of the voltage being applied to the delivery pump determined during the de-energizing pauses;

determining a torque produced by the delivery pump as a function of the speed of the delivery pump; and at least one of:
- a)(I) determining the differential pressure as a function of the torque,
- b)(I) providing at least one of a voltage drop and a profile of the voltage at the delivery pump during the de-energizing pauses to determine the torque, and
  - (ii) determining the differential pressure as a function of the torque, and
- c)(I) determining the differential pressure as a function of the voltage being applied to the delivery pump during the de-energizing pauses, a setpoint value for the voltage, and a pulse-duty factor required to modulate the voltage to the setpoint value.

29. The device according to claim 23, wherein the system is a braking system.

30. The device according to claim 23, wherein the delivery pump is a return pump.

31. The device according to claim 23, wherein the differential pressure is an initial pressure prevailing in the master brake cylinder.

\* \* \* \* \*